Patented Nov. 7, 1939

2,179,217

UNITED STATES PATENT OFFICE 2,179,217

ANTHRAQUINONE ACID WOOL DYESTUFF

David X. Klein, Milwaukee, Wis., assignor to E. I. du Pont de Nemours & Company, Wilmington, Del., a corporation of Delaware No Drawing. Application March 24, 1938, Serial No. 197,860

3 Claims. (Cl. 260—373)

This invention relates to the preparation of new and valuable anthraquinone acid wool dyestuffs and more particularly to 1-amio-4-arylamino-2-anthraquinonesulfonic acids which carry in the 5 or 6 position a hydroxy containing aliphatic ether group, which compounds dye wool in blue shades having good fastness and level dyeing properties.

A number of antraquinonesulfonic acid compounds have been prepared for use in dyeing animal fibers, which are generally referred to as being of the "bromamine acid" type, namely those which are prepared by condensing "bromamine acid", 1-amino-4-bromo-2-anthraquinonesulfonic acid, with arylamines to give the 1-amino-4-arylido-2-anthraquinone sulfonic acid. These compounds, however, unless they contain certain substituents in the aryl group exhibit poor level dyeing properties. A large number of substituted arylamines, particularly of the benzene series, have therefore been employed with the object of improving the dyeing properties of colors of this series.

I have found that by introducing into the 5 or 6 position of the 1-amino-4-arylamino-2-anthraquinonesulfonic acid a hydroxy containing aliphatic ether group, dyestuffs are obtained which dye in blue to greenish blue shades and exhibit improved level dyeing properties. It is to be noted that the introduction of these substituents in the 5 or 6 position does not materially alter the shade of the corresponding dyestuff that does not contain that substituent. The addition of this group in the 5 or 6 position of the anthraquinone nucleus makes it possible to alter the shade of the dyestuff from blue to greenish blue by substituting various arylamines in the 4 position without affecting the level dyeing properties of the dyestuff.

These dyestuffs are prepared from the 1-amino-4-bromo-5- or 6-hydroxy containing aliphatic ethers of 2-anthraquinonesulfonic acid by condensing therewith any desired arylamine, particularly those of the benzene series which are known to give desirable shades for dyeing animal fibers. The 1-amino-5- or 6-hydroxy containing aliphatic ether of 2-anthraquinonesulfonic acid may be prepared by reacting 1-amino-5- or 6-chloro-2-anthraquinonesulfonic acid sodium salt with an excess of the dihydroxy aliphatic compound in the presence of potassium hydroxide at a temperature of 95–100° C. This reaction may be followed microscopically by a change in crystalline structure of the mass. The reaction requires as high as 75 to 96 hours at this temperature. The resulting hydroxy aliphatic ether compound is then brominated, such as by dissolving the same in water and after acidification with sulfuric acid treating with bromine or a bromine liberating agent until one atom of bromine has been introduced into the molecule, and isolating the resulting alkali-metal salt by known procedure. This compound is then condensed with arylamines by any of the processes generally employed for the condensation of arylamines of the benzene series with 1-amino-4-bromo-2-anthraquinonesulfonic acid.

The following examples are given to illustrate the invention more fully, it being understood that these examples are given as illustrations and not as limitations upon the invention. The parts used are by weight.

Example 1

53 parts of 1-amino-4-bromo-5-beta-hydroxy-ethoxy-2-anthraquinonesulfonic acid sodium salt, 27.9 parts aniline, 33.6 parts sodium bicarbonate, 600 parts water, and 0.7 part verdigris are heated at 75–80° C. for seven hours. The reaction is then cooled and the blue crystals filtered off. A small amount of insoluble material is removed by boiling the cake with 1000 parts of water to which 10 parts of charcoal have been added, filtering and salting the filtrate to a 3% solution of sodium chloride. The product is filtered, washed with 3% brine and dried. The so-obtained dyestuff yields level bright blue shades on wool when dyed by the usual procedure.

Example 2

10.92 parts 1-amino-4-bromo-5-beta-hydroxy-ethoxy-2-anthraquinonesulfonic acid sodium salt, 9.12 parts p-aminoacetanilide, 5.70 parts sodium bicarbonate, 0.14 part of copper acetate, and 120 parts water are heated at 75–80° C. for seven hours. After cooling, the cake is filtered off and redissolved in 1000 parts hot water. 25 parts 20° Bé. HCl are added and the precipitated material filtered off. This is again dissolved in 500 parts hot water with 8 parts soda ash. For clarifying the dyestuff, 2 parts charcoal are added and after boiling fifteen minutes the solution is filtered. The dyestuff is precipitated from the filtrate by salting to a 2% solution of sodium chloride, filtered cold, washed with 2% brine and dried. This dyestuff is greener than that mentioned in Example 1 and possesses very superior level dyeing properties.

Example 3

26.5 parts 1-amino-4-bromo-6-beta-hydroxyethoxy-2-anthraquinonesulfonic acid sodium salt, 14 parts aniline, 17 parts sodium bicarbonate, 300 parts water, and 0.5 part copper sulfate are heated at 75–80° C. for eight hours. The product is isolated and clarified as in Example 1. A blue dyestuff is obtained which dyes in desirable level shades.

Example 4

29.2 parts 1-amino-4-bromo-5-diethyleneglycoxy-2-anthraquinonesulfonic acid sodium salt (from 1-amino-5-chloro-2-anthraquinonesulfonic acid and diethyleneglycol with alkali), 28.6 parts sodium bicarbonate, 19 parts aniline, 0.5 part verdigris, and 300 parts water are heated at 75–80° C. for twelve hours. The product is treated as in Example 1, yielding a dyestuff which dyes wool in level blue shades.

The condensation when carried out at from 70 to 80° C. requires from six to twelve hours for completion. Longer times may be used without affecting the product.

In place of the particular arylamines specified in the above examples, other arylamines such as p-phenetidine, o-phenetidine, cresidine, p-toluidine, p-chloroaniline, etc. may be substituted therefor to give dyestuffs which dye in blue shades and which because of the introduction of the hydroxy aliphatic ether group in the 5 or 6 position of the molecule exhibit good level dyeing properties.

I claim:

1. Compounds of the general formula:

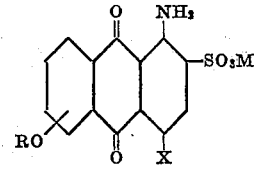

wherein M stands for an element of the class consisting of hydrogen and alkali-metals, X stands for an arylimino radical of the benzene series, and R stands for a radical of the class consisting of aliphatic hydrocarbon and aliphatic ether radicals which carry a free —OH radical and in which the radical RO is attached in one of the positions 5 and 6.

2. A compound of the class consisting of 1-amino-4-arylamino-5-beta-hydroxyethoxy-2-anthraquinonesulfonic acids and their alkali-metal salts in which the arylimino radical is of the benzene series.

3. 1-amino-4-anilido-5-beta-hydroxyethoxy-2-anthraquinonesulfonic acid.

DAVID X KLEIN.